May 17, 1960  A. R. MORRISON  2,936,479
APPARATUS FOR FORMING FIBROUS GLASS
Filed April 23, 1956  2 Sheets-Sheet 2
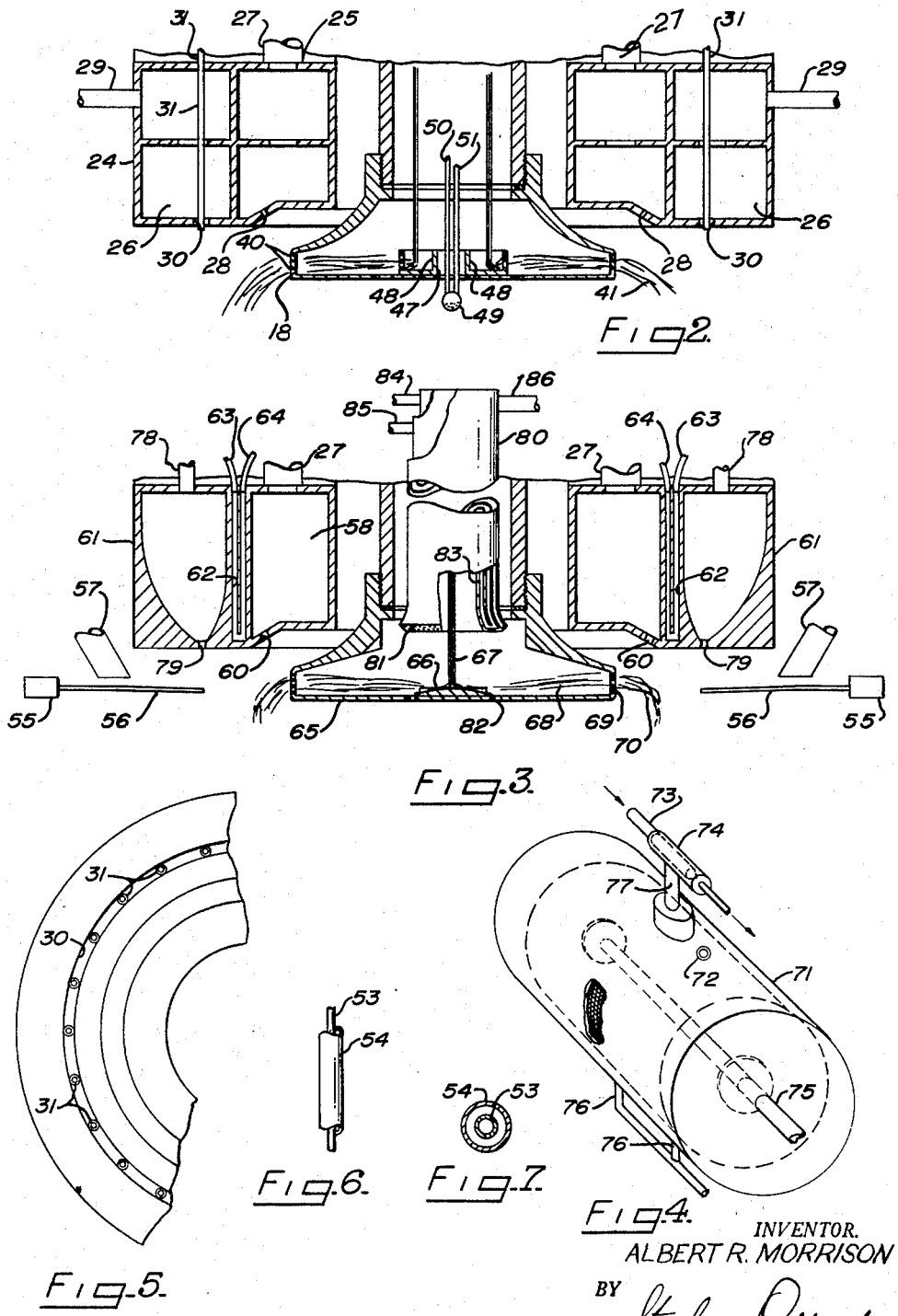
INVENTOR.
ALBERT R. MORRISON
BY
ATTORNEYS

United States Patent Office 2,936,479
Patented May 17, 1960

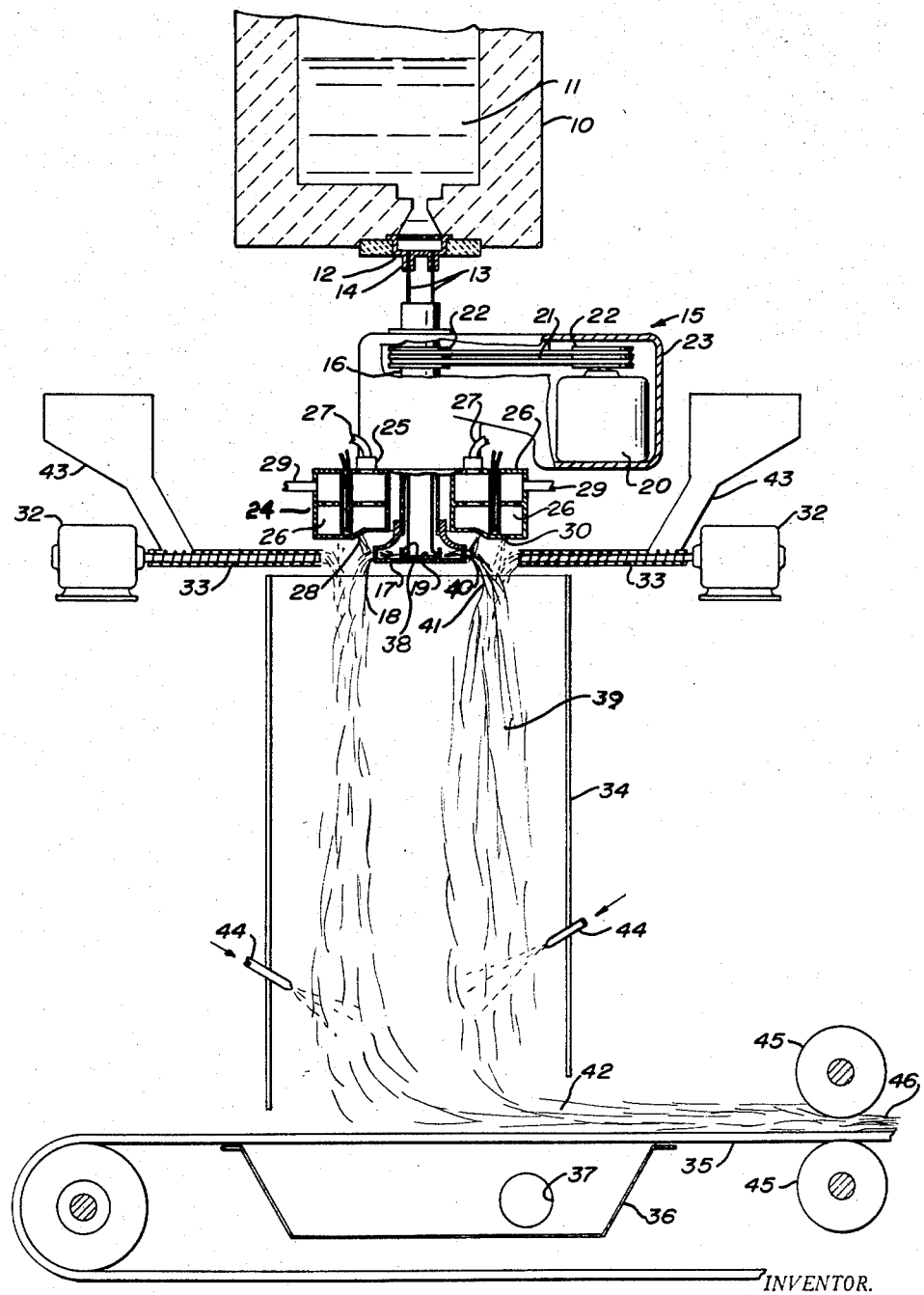

2,936,479
APPARATUS FOR FORMING FIBROUS GLASS

Albert R. Morrison, Newark, Ohio, assignor to Owens-Corning Fiberglas Corporation, a corporation of Delaware Application April 23, 1956, Serial No. 580,098

5 Claims. (Cl. 18—2.5)

This invention relates to apparatus for forming and processing fibers of a heat-softenable material and particularly to fibers produced from mineral materials such as glass, slag, fusible rock or other natural occurring materials.

Various commercial methods have been used to form fibers such as those of glass. These methods include those using various attenuating gases in the form of a blast, such as air, steam and combustion products from a burner. Air has been used to form staple fibers by introducing streams of molten glass into a low pressure air blower which directs air in from opposite sides to attenuate the fibers into staple lengths. Another process used for making building insulation and the like involves the use of steam blowers which direct converging blasts of steam toward molten streams of glass to form fibers of various lengths which are collected in a pack. A rather new method of forming fibers involves the introduction of a molten material upon a rotating spinner which slings the molten material outwardly whereupon it is hit with an attenuating blast to form high quality fibers of a uniform diameter.

In all these methods it is necessary to further treat the fibers so produced in order to make a product which is useful and readily sold. Such treatments include application of various materials to give the products integrity, improved resistance to moisture, pack strength, improved resilience and the like. In the past, wide use has been made of phenolic resins as binders. Other fiber treatments have also been used including such treatments as asphaltic saturants, water proofing treatments and the like. Although such materials have been used widely, the application of various materials in a uniform manner always presents a problem.

It is an object of this invention to provide an improved apparatus for the manufacture of fibers from a mineral material.

It is a further object to provide suitable apparatus for fiberizing a molten material and applying a binder of other materials to the fibers formed.

It is a further object to provide a fiber forming apparatus which is especially adapted for the application of a binder material to fibers as they are formed.

Further objects will be apparent from the description which follows.

The invention embraces means for the introduction of one or more streams of molten material into a receiving zone and then spinning the material in the receiving zone to throw it outwardly in the form of a plurality of streams or bodies of molten material which are then attenuated with a suitable blast of gas. Certain novel aspects are entailed in the introduction of a binder into the fluid used as the attenuating blast. Heretofore, such an approach has been impossible since high temperatures generally used about the fiber forming zone deleteriously affect the organic materials generally used as binders or treating material. The present invention makes it possible to use the attenuating blast in a dual capacity. The gas used for the attenuating blast not only provides the necessary forces for producing fibers, but also distributes binder in an efficient manner so that a pack of fibers with binder thereon is formed inherently.

The invention will be better understood with reference to the drawings, wherein:

Figure 1 is an elevation of apparatus used in carrying out the invention, parts being in section;

Figure 2 is an enlarged elevational view of a portion of the apparatus shown in Figure 1, parts being in section;

Figure 3, a similar view to Figure 2, shows a second embodiment of the apparatus;

Figure 4 is a view of powder dispersing apparatus;

Figure 5 is a bottom view of apparatus having binder tubes in the blower slot;

Figure 6 is a view of a modified binder tube, parts being broken away; and

Figure 7 is a cross-sectional view of modified binder tubes.

The apparatus of the invention is particularly suited for forming fibers of a heat-softenable material, such as glass, wherein primary fibers or streams of material are attenuated to fibers by a blast of a fluid such as a gas and then these fibers are treated with a binder or the like. The apparatus is suitable for forming and treating fibers attenuated from other heat-softenable materials including slag, fusible rock and the like.

One or more forms of apparatus for introducing binder into the attenuating blast are shown in each of Figures 1, 2 and 3. These binder applicators may be used alone or in combination with each other as may be desired.

One form of apparatus as shown in Figure 1 includes a molten glass or other mineral material reservoir 10 which holds a material such as molten glass 11. The reservoir may be a forehearth attached to a melting furnace, or it may be a glass melter for melting cullet or marbles. In the bottom of reservoir 10 is a feeder or bushing 12 through which molten glass flows in the form of one or more streams 13, 13. The feeder 12 has one or more tips 14 provided with orifices through which the molten glass flows in the form of streams 13. Although two tips are shown in the feeder of Figure 1, it should be understood that any suitable number of tips may be used and for many applications a single tip is adequate.

The fiber forming apparatus 15 comprises a hollow shaft 16 to which is secured a hollow bell-shaped spinner 17. The outer band 18 of the spinner has a plurality of orifices through which molten material flows when the spinner is rotated. The spinner is also provided with an inner cup 19 which has perforated walls through which the molten material flows when the spinner is rotated. The spinner is rotated by an electric motor 20 through drive belts 21, 21 and sheaves 22, 22. The motor and drive belts are enclosed in a housing 23 of cast metal.

Disposed above spinner 17 is blower assembly 24 which comprises a sectional burner assembly 25 disposed concentrically within an annular blower 26 for the attenuating fluid, see Figures 1 and 2. The burner assembly has inlets 27, 27 for the fuel and air mixture and nozzles 28 from which the gas or other fuel and air mixture emits and burns. The flame burns outside the burner and heats that zone about the periphery of the spinner 17. The blowers are provided with fluid inlets 29 for the introduction of air or the like, and with a slot 30 for discharging the fluid under pressure. Extending into the blower may be binder inlets 31, 31 which introduce a suitable binder at blower slot 30, see Figure 2. The burner and blower assemblies are separated by a water jacket as shown in Figures 1 and 3, if desired. Such a jacket makes it possible to control the temperature within the blowers.

In Figure 1 is shown one apparatus for introducing a powdered binder at the forming section of the fiber producing apparatus. The screw feed binder dispenser 43 comprises an electric motor 32 which drives a screw 33 that advances powdered binder from a hopper into the fluid stream emitting from blowers 26, 26. A plurality of these powdered binder screw-fed devices are spaced about the spinner and the blowers 26 to introduce a sufficient amount of powdered binder into the blast from the blowers.

Below the blower assembly is a hood 34 which confines the fibers being formed and the attenuating gases and binder while these materials travel downwardly to conveyor chain 35. Below the collecting chain is a suction box 36 having an outlet pipe 37 for removal of gas from the suction box.

During operation of the apparatus shown in Figure 1, molten material flows from reservoir 10 in the form of streams 13 down into inner cup 19 of spinner 17. The spinner is rotated by the electric motor 20 and due to centrifugal action, the molten material flows to the perforated wall 38 of inner cup 19. Due to the rotation of the spinner and inner cup, the glass which collects in the inner cup 19 slings outwardly through the perforated wall 38 to perforated outer band 18 of the spinner 17 whereupon the glass flows through the holes 40, 40 in the outer band 18 in the form of streams 41 of molten material. The molten material flows from the spinner in the form of streams 41 or elongated molten bodies or primary fibers which are then attenuated by the blast from blowers 26 into rather long fibers of fine diameter.

The flame from the burners heats that zone about the periphery of the spinner and helps maintain the outer band 18 of the spinner 17 at the desired operating temperature. This flame need not be a high velocity flame since most of the attenuation forces are provided by blowers 26, 26. The flame also can add heat to the elongated molten bodies emitting from the spinner to provide a less viscous material for fiberization. The fluid emitting from the blower is preferably a gas such as air, steam or any other suitable gas; however, liquids may be used as attenuating means, if desirable. For instance, water under pressure has been demonstrated to be a feasible attenuating means for the production of fibers, such as fibrous glass. For the purposes of illustration, air will be described as the fluid which is being discharged from the blowers in the blower assembly. The air introduced through inlets 29, 29 passes outwardly from blowers 26, 26 and as it does so picks up binder which is discharged from binder tubes 31, 31 in Figure 2 or from screws 33 in Figure 1. The air being discharged from slot 30 in blower 26 carries the binder, in the form of very small particles, downwardly from the blowers.

As the streams 41 of molten material hit the blast from blowers 26, 26, they are turned downwardly 90° and the streams are attenuated into fine diameter fibers 39 of considerable length. These fibers 39, 39 are intimately mixed with binder particles and this mixture of fibers and binder is collected upon conveyor chain 35 in the form of a pack 42. The binder, if it is in a liquid form such as an aqueous dispersion, filters out upon the fibers which collect in the pack 42 and the binder collects over most of the surface of the fibers and centers especially at the junctures of the fibers. Binder dispersions can be applied with binder tubes 31 in Figure 2. The fluid blast from slot 30 breaks up the dispersion into finely divided droplets which intermix with the fibers.

Alternatively, the binder is applied in the powdered form by the use of the screw-feed binder dispenser 43 which discharges powdered binder directly into the blast from the blowers 26, 26, see Figure 1. A third means for introducing binder is also shown in Figure 1. Binder spray nozzles 44, 44 are shown inserted into the walls of hood 34, which nozzles are adapted for spraying a binder such as a dispersion of a phenolic binder into the hood to deposit upon the fibers collected on conveyor chain 35. The binder tubes 31, 31 in the blowers, the screw-feed binder dispenser 43, and the binder spray nozzles 44 may be used alternatively or they may be used together in any combination if it is desirable to apply greater amounts of binder than can be applied with one of the applicator means alone. There are certain advantages achieved by the use of both powdered and liquid binder; therefore, a combination of the screw-feed powdered binder applicator and the binder tubes for applying liquid binder through the blowers may be used to advantage. These advantages include higher loading of the pack with binder and more uniform dispersion of binder.

After the pack is formed on the conveyor chain, it passes between a pair of rolls 45, 45 which compress the pack to the desired thickness. The pack 46 from the compression rolls is directed into a suitable oven for drying and curing the resinous binder. Generally hot air ovens are used in curing resins applied to fiber products. The desired density is achieved by compressing the pack and maintaining the proper thickness until the binder is cured.

In Figure 2 is shown apparatus somewhat similar to that shown in Figure 1 with the exception that the inner cup 19 is provided with a center opening 47 and upstanding walls 48, 48. Through opening 47 is inserted a binder nozzle 49 which is adapted for spraying a binder on the inside of the beam or cylinder of fibers produced by the apparatus. A tube 50, for introducing an aqueous dispersion of a binder such as phenol-formaldehyde resin, and an air tube 51, which can be used for atomizing the aqueous dispersion, support binder nozzle 49.

Generally air or another suitable fluid is used to disperse and blow the binder applied through binder tubes 31, 31, see Figures 2 and 5. The air discharged through slot 30 of blower 26 disperses and propels the binder. If it is desirable to assure more complete and uniform atomization of the binder dispersion introduced through binder tubes 31, 31, a construction such as that shown in Figures 6 and 7 is used. Concentric tubes are used; the inner tube is a binder tube 53 and the outer tube an air tube 54. The air from tube 54 atomizes the aqueous dispersion of binder which comes through binder tube 53. The concentric tubes shown in Figures 6 and 7 may be substituted for the tubes 31 shown in Figures 2 and 5. When such a substitution is made, the binder particles which have been broken up and dispersed by the air introduced through air tube 53 are further dispersed by the fluid emitting from the blower 26 through slot 30 in which the concentric air and binder tubes are disposed.

Binder nozzle 49 may be used with binder tubes 31, 31 or either of the binder applicators may be used alone. Binder nozzle 49 also may be used in conjunction with the screw-feed binder dispenser 43 shown in Figure 1.

Other powdered binder dispensers may be used. An example is shown in Figure 3 where electrical vibrator 55 having an arm 56 in the form of a spatula or a semi-annular shaker plate is disposed below a powdered binder inlet tube 57. Powdered binder or a liquid binder is introduced upon the shaker plate and is then removed by the vibrating action. As the binder leaves the shaker plate, it is introduced into the fluid blast from blowers 61 and intermingles with fibers being attenuated by the blast.

The apparatus shown in Figure 3 is a modified form which uses burners 58, 58 having nozzles 60 to add heat to the fluid material coming from spinner 65. The blowers 61 shown in Figure 3 are designed to handle a dry, powdered binder and air mixture. The blower 61 is positioned next to the burners 58 with a cooling chamber 62 disposed therebetween. A suitable coolant such as water is introduced through tubes 63 and removed from the chamber through tubes 64. Spinner 65 shows a modification which is sometimes desirable. A generally disc-shaped deflector 66 is secured to the bottom of the spinner, which deflector is adapted for slinging outwardly any molten glass introduced thereon. A stream 67 of molten material such as glass is allowed to hit upon the rotating deflector 66 and by centrifugal action the material is thrown off. The molten material 68 which is slung by centrifugal force passes outwardly and covers the outer band 69 of spinner 65. The molten material passes through the holes in the outer band to form streams 70 which are attenuated into fibers by the blast from blowers 61, 61 and by the combustion products from burners 58. It should be understood that burners such as those of Figure 1 can be used with the blowers 61 of Figure 3.

A powdered binder and air mixture is provided by an apparatus such as that shown in Figure 4. Powder is introduced into the air-powder mixing device 71 through filler opening 72. After the filler opening is closed, high pressure air is introduced through inlet 73 into high velocity air injector 74. Shaft 75 is commenced to rotate and low pressure air is introduced through inlets 76, 76 in the mixing device. The powder is tumbled by the rotation of the cylindrical screen which is mounted upon shaft 75 and is thereby intimately mixed with the low pressure air introduced through inlets 76, 76. This air-dispersed powder is then drawn from the mixing device through outlet 77 by the action of high velocity air injector 74. The powder in the high velocity air is directed through inlet tubes 78 of the blower 61. The binder and air mixture is discharged from the openings 79 in the blower 61, 61. The air from the blowers 61 attenuates the streams of molten material into fibers and also carries the binder which is codeposited with the fibers upon a suitable collecting device.

The spinner is provided with an internal burner 80 which comprises a double walled tube through which a gas and air mixture is introduced and discharged through openings 81 at the lower end of the burner. When the burner is lit, the flame fills the inside of the spinner 65 and the products of combustion are exhausted through holes 82, 82 in the bottom of the spinner 65. The internal burner has a water cooled inner jacket 83, having a water inlet line 84 and a water outlet 85. A gas-air mixture is introduced through line 86.

Various other means for deflecting the molten stream or streams from the feeder so that the molten material strikes the inner side of the outer band of the spinner may be used. An inner cup having a perforated wall and a slinger plate have been shown; however, various other means have been used. For instance, an air nozzle may be positioned within the spinner by inserting the nozzle through the hollow shaft of the spinner with the air inlet pipe to the nozzle acting as the supporting arm for the air nozzle itself. The stream of glass from the feeder then drops downwardly from the feeder until it hits the air from the air nozzle and the stream is turned 90° and driven to the inside of the outer band of the spinner. Centrifugal force then takes the molten material through the perforated outer band and forms streams of molten material which are attenuated as has been described.

Burners have been shown for adding heat to the molten material just prior to the time that it is attenuated by the force of the attenuating blast from the blowers. Other means of adding heat to the molten material at this critical point may be used, for instance, resistance heaters may be positioned so that a heated zone is maintained at the periphery of the spinner. Likewise radiant heaters or induction heating apparatus may be used for maintaining the proper temperature at the spinner.

The advantages achieved with the present invention are manyfold. It is possible to apply large amounts of binder to the fibrous products since binder is readily introduced into the attenuating blast itself. As soon as the fibers are produced they are intimately mixed with binder particles. The apparatus is readily adaptable for use with many supplementary binder applicator devices as illustrated and described. The binder introduced into the attenuation zone surrounding the spinner makes it possible for the binder to contact the freshly-formed surfaces of the fibers being formed.

Combination of materials with glass surfaces takes place more readily when the glass surfaces are freshly prepared and free of contaminants. A mixture of fibers and resin, which are prepared as disclosed, is preconditioned for subsequent application of binder materials either by a filtering or settling out process or by spraying of additional binder thereon.

The intimate mixing of fibers and binder before the fibers are collected also provides uniform dispersal of binder throughout the fiber pack.

Within the spirit and scope of the invention modifications and various arrangements may be made other than those disclosed, and it is to be understood that the present disclosure is merely illustrative, the invention including all variations thereof.

I claim:

1. Apparatus for forming fibers from a heat-softenable material including, in combination, a supply of molten material and means for flowing a stream of molten material from the supply, a rotatable spinner adapted to engage the stream of molten material having a perforated band defining its periphery and a hollow shaft upon which it is rotated, means for rotating the spinner whereby the molten material is distributed by centrifugal forces through the perforated band in outwardly directed paths in the form of primary fibers, an annular burner assembly disposed immediately about the rotatable spinner for heating said perforated band and the zone about said perforated band, an annular blower assembly disposed concentrically about said burner assembly having an annular opening for discharging an attenuating blast into contact with the primary fibers, and a plurality of distributors spaced one from another surrounding said spinner for introducing fiber treatment material into the attenuating blast as it emerges from said annular opening to effect a uniform distribution of said material throughout the attenuating blast prior to contact of the blast with the primary fibers.

2. The apparatus of claim 1 wherein the distributors for introducing a fiber treatment material comprise tubes disposed in the annular opening of said annular blower.

3. The apparatus of claim 2 wherein each of the tubes comprises two concentric tubes, the innermost of which carries fiber treatment material and the outermost a gas for dispersing and carrying said material.

4. Apparatus of claim 1 wherein the distributors for introducing fiber treatment material comprise semi-annular shaker plates and powdered material inlet tubes for introducing said material onto the shaker plates.

5. Apparatus of claim 1 wherein the distributor for introducing fiber treatment material comprise multiple screws positioned adjacent the annular opening of the blower for controllably introducing powdered material into the blast from said blower.

References Cited in the file of this patent

UNITED STATES PATENTS

| 1,656,828 | Powell | Jan. 17, 1928 |
| 1,968,851 | Mottweiler | Aug. 7, 1934 |
| 1,977,406 | Powell | Oct. 16, 1934 |
| 2,112,557 | Chantler | Mar. 29, 1938 |
| 2,116,663 | Powell | May 10, 1938 |
| 2,328,714 | Drill et al. | Sept. 7, 1943 |
| 2,609,566 | Slayter et al. | Sept. 9, 1952 |
| 2,624,912 | Heymes et al. | Jan. 13, 1953 |
| 2,647,851 | Schwartz | Aug. 4, 1953 |
| 2,707,690 | Pearson | May 3, 1955 |
| 2,707,847 | Anliker | May 10, 1955 |
| 2,763,099 | Slayter et al. | Sept. 18, 1956 |

FOREIGN PATENTS 545,632    Belgium _____ Feb. 1956
(Corresponding French Patent, 1,124,487, July 2, 1956.)

OTHER REFERENCES

Abstract of Belgian Patent No. 545,632, in "Recueil des Brevets d'Invention," 1956, vol. 2, page 252.